United States Patent
Destarac et al.

(10) Patent No.: US 6,890,980 B2
(45) Date of Patent: May 10, 2005

(54) SYNTHESIS OF BLOCK POLYMERS OBTAINED BY CONTROLLED FREE RADICAL POLYMERIZATION

(75) Inventors: Mathias Destarac, Paris (FR); Frédéric Leising, Avilly Saint Leonard (FR); Alex Dureault, Paris (FR); Daniel Taton, Camarsac (FR); Yves Gnanou, Talence (FR); Ramiro Guerrero-Santos, Mexique (MX)

(73) Assignee: Rhodia Chimie, Bouloue Billancourt ( * ) Notice: Subject to any disclaimer, the term of this patent is extended or adjusted under 35 U.S.C. 154(b) by 0 days.

(21) Appl. No.: 10/416,007

(22) PCT Filed: Nov. 6, 2001

(86) PCT No.: PCT/FR01/03438

§ 371 (c)(1),
(2), (4) Date: Aug. 28, 2003

(87) PCT Pub. No.: WO02/36640

PCT Pub. Date: May 10, 2002

(65) Prior Publication Data

US 2004/0030041 A1 Feb. 12, 2004

(30) Foreign Application Priority Data

Nov. 6, 2000 (FR) .......................................... 00 14202

(51) Int. Cl.$^7$ ..................... C08K 5/5398; C08L 25/02
(52) U.S. Cl. ..................... 524/115; 524/134; 524/137; 525/241; 525/242; 525/255; 525/98
(58) Field of Search .............................. 525/115, 134, 525/137, 241, 242, 255, 98; 524/115, 134, 137

(56) References Cited

U.S. PATENT DOCUMENTS 6,414,061 B1 * 7/2002 Cruse et al. ................ 524/262

FOREIGN PATENT DOCUMENTS

| DE | 18 00 327 | 7/1969 |
|---|---|---|
| WO | WO 98/01478 | 1/1998 |
| WO | WO 00/20465 | 4/2000 |

* cited by examiner

Primary Examiner—James J. Seidleck
Assistant Examiner—Olga Asinovsky
(74) Attorney, Agent, or Firm—Burns, Doane, Swecker & Mathis, L.L.P.

(57) ABSTRACT

The invention concerns a method for preparing a first generation polymer comprising a step which consists in free radical polymerization of a composition comprising: at least an ethylenically unsaturated monomer, a source of free radicals, and at least a cyclic organic compound including at least a tetrathiophosphate group.

24 Claims, No Drawings

SYNTHESIS OF BLOCK POLYMERS OBTAINED BY CONTROLLED FREE RADICAL POLYMERIZATION

The present invention relates to a novel process of free radical polymerization which provides block polymers, and to the block polymers thus obtained.

Block polymers are commonly prepared by ionic polymerization. This type of polymerization has the drawback of allowing the polymerization only of certain types of apolar monomers, especially styrene and butadiene, and of requiring a particularly pure reaction medium and temperatures often lower than ambient, in order to minimize side reactions, thereby resulting in severe operational constraints.

Free radical polymerization has the advantage of being easy to implement without observing excessive purity conditions, and at temperatures of ambient or above. Until recently, however, there was no free radical polymerization process allowing block polymers to be obtained.

In conventional free radical polymerization, the reactivity of the growing macroradicals is nonselective: the chains undergo irreversible termination by coupling or dismutation. As a consequence, it is very difficult to control the structure of the chains. The possibilities for obtaining functional polymers, telechelic polymers or block copolymers are extremely limited. Recently, a new process of free radical polymerization has been developed: this is "controlled" or "living" free radical polymerization. A number of techniques have been developed in which the polymeric chain ends can be reactivated by virtue of a reversible termination or transfer reaction (dormant species/active species equilibrium).

Controlled free radical polymerization presents the following distinctive aspects:
1. the number of chains is fixed throughout the reaction;
2. the chains all grow at the same rate, which results in:
  a linear increase in molecular masses with conversion,
  a narrowed mass distribution;
3. the average molecular mass is controlled by the molar ratio of monomer to chain precursor;
4. the possibility of preparing block copolymers.

The controlled character is all the more marked given that the rate of reactivation of the chains to radical is very great, ahead of the rate of chain growth (propagation). Cases exist where this is not always true (i.e., the rate of reactivation of the chains to radical is lower than the propagation rate) and conditions 1 and 2 are not observed; nevertheless, it is still possible to prepare block copolymers.

Several approaches have been described for controlling free radical polymerization by reversible termination reaction. The most commonly cited consists in introducing into the medium counterradicals which reversibly combine with the growing macroradicals, such as for example the nitroxyl radicals (Georges et al., *Macromolecules*, 26, 2987, (1993)). This technique is characterized by high temperatures for making the C—O bond labile. Another method called Atom Transfer Radical Polymerization involves salts of transition metals combined with organic ligands and an initiator which is generally an organic halide; the control of polymerization is made possible by the reversible cleavage of the C-Halogen bond (Matyjaszewski K., patent application WO 96/30421). A drawback of this polymerization is that a large quantity of metal remains in the reaction medium at the end of polymerization. Otsu (Otsu et al., *Makromol. Chem. Rapid Comm.*, 3, 127–132, (1982), Otsu et al. *ibid*, 3, 123–140, (1982), Otsu et al., *Polymer Bull.*, 7, 45, (1984), *ibid*, 11, 135, (1984), Otsu et al., *J. Macromol. Sci. Chem.*, A21, 961, (1984), Otsu et al., *Macromolecules*, 19, 2087, (1989)), have shown that some organic sulfides, particularly dithiocarbamates, made it possible under UV irradiation to cause chains to grow in a controlled manner. The principle is based on the photolysis of the C—S bond which regenerates the carbon macroradical, on the one hand, and the dithiocarbamyl radical, on the other hand. The controlled character of the reaction is due to the reversibility of the C—S bond under UV irradiation. It is thus possible to obtain block copolymers. By contrast, the equilibrium constant for activation/deactivation is not very favorable in the light of the speed of propagation, which has the consequence of generating relatively wide molecular mass distributions. Thus, the polydispersity index ($I_p=M_w/M_n$) is between 2 and 5 (Otsu et al., 25, 7/8, 643–650, (1989)).

As regards the methods based on a reversible transfer, there may be mentioned iodine transfer polyermization (ITP) developed by Tatemoto (Tatemoto et al., EP 272698, Daikin Industries Ltd.), more recently rediscovered by Matyjaszewski and renamed "Degenerative Transfer" (Matyjaszewski et al., *Macromolecules*, 28, 2093 (1995)). PCT patent applications WO 98/01478 in the name of DuPont de Nemours and WO 99/35178 in the name of Rhodia Chimie describe the use of transfer agents which are reversible by addition-fragmentation, of the RSC=SR' dithioester type, for the synthesis of copolymers possessing controlled architecture. Another family of reversible transfer agents, the xanthates RSC=SOR', were described in patent application WO 98/58974 in the name of Rhodia Chimie as precursors of block copolymers. The control of free radical polymerization by dithiocarbamates $RS(C=S)NR_1R_2$ has also recently been described in the patent applications WO 99/35177 in the name of Rhodia and WO 99/31144 in the name of DuPont de Nemours.

Controlled free radical polymerization possesses an advantage over conventional free radical polymerization when the aim is to prepare chains which are of low molecular weight and are functionalized (reactive telomers). Such polymers are required for specific applications such as, for example, coatings and adhesives.

Thus, when the aim is to synthesize chains grafted with on average 2 functional comonomers, the fraction of chains having one functional site at most becomes great when the average degree of polymerization is less than a threshold value (e.g. 20 or 30). Controlled free radical polymerization makes it possible to reduce or even inhibit the formation of these oligomers to zero or one functional site, which are detrimental to application performance.

In the remainder of the description, the term "polymer", is used to describe homopolymers or copolymers, unless indicated otherwise.

Moreover, a block polymer is understood to be a copolymer comprising at least two successive enchainments of blocks of monomer units of different chemical constitution. The blocks may consist of a homopolymer or of a polymer obtained from a mixture of ethylenically unsaturated monomers. In this case the block may be a random copolymer. The block copolymer may comprise two blocks each composed of random copolymers. In this case, the ethylenically unsaturated monomers are such that the blocks obtained are different in nature. By differences in nature are meant blocks composed of monomers of different types, but also blocks composed of monomers of the same type but in different amounts.

One aim of the present invention is to provide a novel process of free radical polymerization using a novel control agent.

A second aim of the invention is to provide a process of polymerization during which the number average molar masses $M_n$ of the polymers obtained are effectively controlled, these number average molar masses $M_n$ varying upwards with the conversion of the monomer.

Another aim is to provide a controlled free radical polymerization process for synthesizing chain end functionalized polymers.

These aims and others which will appear in the remainder of the description are achieved by the present invention, which provides a process for preparing a first generation functionalized polymer, which comprises a step of free radical polymerization of a composition comprising:
- at least one ethylenically unsaturated monomer,
- a source of free radicals, and
- at least one cyclic organic compound comprising at least one tetrathiophosphate group.

By tetrathiophosphate group is meant a group of formula:

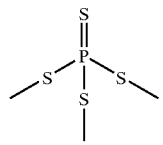

More particularly, the cyclic organic compound comprising at least one tetrathiophosphate group is chosen from a compound of formula (IA) (tetraphosphorus decasulfide or $P_4S_{10}$) and a compound of general formula (IB):

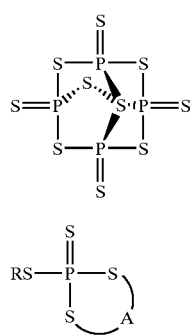

where A represents an optionally substituted, linear or branched alkyl radical, or a group chosen from the groups of the following formulae (IIA) and (IIB):

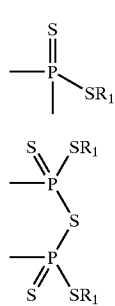

with $R_1$, which are identical or different, represents an optionally substituted alkyl, aryl, aralkyl, alkene or alkyne group, and where R, which is different or identical, represents:
- an optionally substituted alkyl, aryl, aralkyl, alkene or alkyne group,
- an optionally substituted, aromatic, saturated or unsaturated heterocycle or carbon ring,
- a polymeric chain,
- a radical of formula (IIIA):

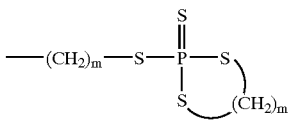

- a radical of formula (IIIB):

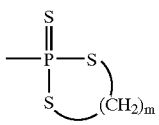

with m, which is identical or different, an integer greater than or equal to 2.

Advantageously, m is less than or equal to 5.

According to the present invention, the optionally substituted alkyl, aryl, aralkyl, alkene or alkyne groups generally have 1 to 20 carbon atoms, preferably 1 to 12, and more preferably 1 to 9 carbon atoms. They may be linear or branched. They may also be substituted especially by oxygen atoms, in the form especially of esters, sulfur or nitrogen atoms.

Among the alkyl radicals, mention may be made especially of the methyl, ethyl, propyl, butyl, pentyl, isopropyl, tert-butyl, pentyl, hexyl, octyl, decyl or dodecyl radical.

The alkene radicals are radicals generally of 2 to 10 carbon atoms; they have at least one ethylenic unsaturation, such as the vinyl or allyl radical.

The alkyne groups are radicals generally of 2 to 10 carbon atoms; they have at least one acetylenic unsaturation, such as the acetylenyl radical.

Among the aryl radicals, mention may be made especially of the phenyl radical, optionally substituted especially by a nitro or hydroxyl functional group.

Among the aralkyl radicals mention may be made especially of the benzyl or phenethyl radical, optionally substituted especially by a nitro or hydroxyl functional group.

When R is a heterocycle, the piperidine, morpholine, pyrrolidone or piperazine radical is preferred.

When R is a polymeric chain, this polymeric chain may result from an ionic or free radical polymerization or from a polycondensation.

The group R, when it is substituted, may be substituted by substituted phenyl groups, substituted aromatic groups, saturated or unsaturated carbon rings, saturated or unsaturated heterocycles, or by the following groups: alkoxycarbonyl or aryloxycarbonyl (—COOR'), carboxyl (—COOH), acyloxy (—O$_2$CR'), carbamoyl (—CONR'$_2$), cyano (—CN), alkylcarbonyl, alkylaryl-carbonyl, arylcarbonyl, arylalkylcarbonyl, phthalimido, maleimido, succinimido, amidino, guanidino, hydroxyl (—OH), amino (—NR'$_2$), halogen, perfluoroalkyl $C_nF_{2n+1}$, allyl, epoxy, alkoxy (—OR'), S-alkyl, S-aryl, groups exhibiting an ionic or hydrophilic character, such as alkali metal salts of carboxylic acids, alkali metal salts of sulfonic acid, polyalkylene oxide chains (PEO, POP), cationic substituents (quaternary ammonium salts), R' representing an alkyl or aryl group or a polymeric chain.

In one particular embodiment, R is a substituted or unsubstituted, preferably substituted, alkyl group.

When A represents an optionally substituted alkyl radical, the preferred alkyl radical is the radical of formula

in which m is an integer greater than or equal to 2.

Advantageously, the maximum value of m is 5.

Preferably, the groups $R_1$ in a compound of formula (IB) are identical.

Preferably, the groups R and $R_1$ in a compound of formula (IB) are identical.

The compound (IB) useful in the present invention is, for example, a compound of formula (IB) in which R is chosen from:

$C_6H_5$
$CH_2C_6H_5$
$CH(CH_3)(C_6H_5)$
$C(CH_3)_2(C_6H_5)$
$C(CH_3)_2CN$.

Among the compounds of formulae (IB), the compounds of the following formulae (IB1), (IB2), (IB3), (IB4) and (IB5) may be especially chosen:

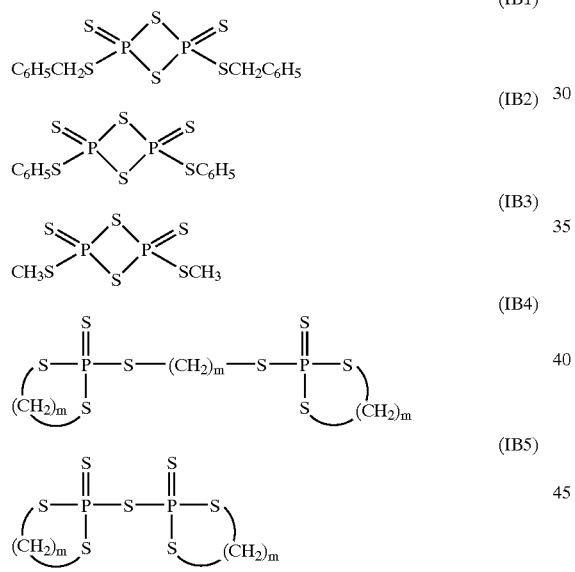

The compounds of formulae (IA) and (IB) have the advantage of being readily available. The compound of formula (IA) and certain reagents of formula (IB), such as the compound 2,4-bis(methylthio)-2,4-dithioxo-1,3,2,4-dithiadiphosphetane, are commercial products. Certain reagents of formula (IB) may especially be obtained by reaction between the compound of formula (IA) with at least one alcohol (ROH) or at least one thiol (RSH) (H. Davy, *J. Chem. Soc., Chem. Commun.*, 457 (1982); G. Ohms et al. *J. Chem. Soc. Dalton Trans.* 1297 (1995); M. Démarcq *J. Chem. Soc. Dalton Trans.* 2221 (1988)).

In all cases the process of the invention is implemented in the presence of a source of free radicals; however, for certain monomers, such as styrene, the free radicals which allow the polymerization to be initiated may be generated by the ethylenically unsaturated monomer itself at sufficiently high temperatures, generally greater than 100° C. In this case it is not necessary to add a source of additional free radicals.

The source of free radicals useful in the process of the present invention is generally a free radical polymerization initiator. The free radical polymerization initiator may be selected from the initiators conventionally used in free radical polymerization. This may be, for example, one of the following initiators:

hydrogen peroxides such as: tertiary butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutarate, lauroyl peroxide, t-amyl peroxypivalate, t-butyl peroxy-pivalate, dicumyl peroxide, benzoyl peroxide, potassium persulfate, ammonium persulfate;

azo compounds such as: 2-2'-azobis(isobutyro-nitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2,21-azobis(N,N'-dimethyleneisobutyramidine) dichloride, 2,2'-azobis(2-amidinopropane) dichloride, 2,2'-azobis-(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)-propionamide], 2,2'-azobis(isobutyramide) dihydrate, redox systems comprising combinations such as:
  mixtures of hydrogen peroxide, alkyl peroxide, peresters, percarbonates and the like and of any one of the iron salts, titanous salts, zinc formaldehyde-sulfoxylate or sodium formaldehyde-sulfoxylate, and reducing sugars;
  alkali metal or ammonium persulfates, perborate or perchlorate in combination with an alkali metal disulfite, such as sodium metabisulfite, and reducing sugars;
  alkali metal persulfate in combination with an arylphosphinic acid, such as benzenephosphonic acid and other similar acids, and reducing sugars.

In accordance with one embodiment, the amount of initiator to be used is determined such that the amount of radicals generated is not more than 50 mol %, preferably not more than 20 mol %, relative to the quantity of cyclic organic compound comprising at least one tetrathiophosphate group.

The ethylenically unsaturated monomers useful in the process of the present invention are all monomers which polymerize in the presence of the cyclic organic compound comprising at least one tetrathiophosphate group to give active polymeric chains.

These ethylenically unsaturated monomers are for example styrene and styrene derivatives such as alpha-methylstyrene or vinyltoluene, vinyl esters of carboxylic acid, such as vinyl acetate, vinyl Versatate®, vinyl propionate, vinyl and vinylidene halides, ethylenically unsaturated monocarboxylic and dicarboxylic acids, such as acrylic acid, methacrylic acid, itaconic acid, maleic acid, fumaric acid, and the monoalkyl esters of the dicarboxylic acids of the type mentioned with alkanols having preferably from 1 to 4 carbon atoms, and their N-substituted derivatives, amides of unsaturated carboxylic acids, such as acrylamide, methacrylamide, N-methylolacrylamide or -methacrylamide, N-alkylacrylamides, ethylenic monomers containing a sulfonic acid group and its alkali metal or ammonium salts, for example vinylsulfonic acid, vinylbenzenesulfonic acid, alpha-acrylamidomethylpropanesulfonic acid, 2-sulfoethylene methacrylate, amides of vinylamine, particularly vinylformamide or vinylacetamide, unsaturated ethylenic monomers containing a secondary, tertiary or quaternary amino group or a heterocyclic group containing nitrogen, such as, for example, vinylpyridines, vinylimidazole, aminoalkyl (meth) acrylates and aminoalkyl-(meth)acrylamides, such as dimethylaminoethyl acrylate or methacrylate, ditert-butylaminoethyl acrylate or methacrylate, dimethylaminomethyl-acrylamide or -methacrylamide, or zwitterionic monomers such as, for example, sulfopropyl-(dimethyl)aminopropyl acrylate, dienes, for example butadiene, chloroprene, (meth)acrylic esters, vinyl nitriles, vinylphosphonic acid and its derivatives.

The use of the following monomers is preferred:

styrene and styrene derivatives such as alpha-methylstyrene or vinyltoluene, vinyl and vinylidene halides, vinyl nitriles, dienes, for example butadiene or chloroprene, unsaturated ethylenic monomers containing a secondary, tertiary or quaternary amino group or a heterocyclic group containing nitrogen, such as, for example, vinylpyridines and vinylimidazole.

By (meth)acrylic esters are meant the esters of acrylic acid and of methacrylic acid with hydrogenated or fluorinated $C_1$–$C_{12}$, preferably $C_1$–$C_8$, alcohols. Among the compounds of this type mention may be made of: methyl acrylate, ethyl acrylate, propyl acrylate, n-butyl acrylate, isobutyl acrylate, 2-exhylhexyl acrylate, t-butyl acrylate, methyl methacrylate, ethyl meth-acrylate, n-butyl methacrylate, isobutyl methacrylate.

The vinyl nitriles include more particularly those having from 3 to 12 carbon atoms, such as acrylonitrile and methacrylonitrile in particular.

For the preparation of polyvinylamine blocks it is preferred to use as ethylenically unsaturated monomers the amides of vinylamine, for example, vinylformamide or vinylacetamide. The polymer obtained is then hydrolyzed at acidic or basic pH.

For the preparation of polyvinyl alcohol blocks it is preferred to use as ethylenically unsaturated monomers the vinyl esters of carboxylic acid, such as vinyl acetate, for example. The polymer obtained is then hydrolyzed at acidic or basic pH.

The types and amounts of polymerizable monomers employed in accordance with the present invention vary depending on the particular end use for which the polymer is intended. These variations are well known and can be readily determined by the skilled worker.

These ethylenically unsaturated monomers may be used alone or in mixtures.

In accordance with one specific embodiment, in the process for preparing a first generation polymer, the ethylenically unsaturated monomer corresponds to the formula (VIA): $CXX'(=CV-CV')_b=CH_2$, the first generation polymer obtained comprises n times the unit of formula (IV):

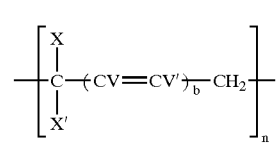

formula (IV)

with n is greater than or equal to 1, preferably greater than 6,

V, V', which are identical or different, represent: H, an alkyl group or a halogen, X and X', which are identical or different, represent H, a halogen or a group $R_2$, $OR_2$, $O_2COR_2$, NHCOH, OH, $NH_2$, $NHR_2$, $N(R_2)_2$, $(R_2)_2N^+O^-$, $NHCOR_2$, $CO_2H$, $CO_2R_2$, CN, $CONH_2$, $CONHR_2$ or $CON(R_2)_2$, in which $R_2$ is selected from alkyl, aryl, aralkyl, alkylaryl, alkene or organosilyl groups which are optionally perfluorinated and optionally substituted by one or more carboxy, epoxy, hydroxyl, alkoxy, amino, halogen or sulfonic groups, and b is 0 or 1.

The polymerization may be conducted in bulk, in solution, in emulsion, in dispersion or in suspension. It is preferably implemented in solution or in emulsion.

The process is preferably implemented semicontinuously.

The temperature may vary between the ambient temperature and 150° C. in accordance with the nature of the monomers used.

In general, during the polymerization, the instantaneous polymer content with respect to the instantaneous amount of monomer and polymer, is between 50 and 99% by weight, preferably between 75 and 99%, more preferably still between 90 and 99%. This content is maintained, in a known way, by controlling the temperature, the rate of addition of the reactants and, where appropriate, the polymerization initiator.

The process is generally implemented in the absence of a UV source, by thermal initiation.

In accordance with one variant of the invention, at least one acidic organic compound may be added to the composition of the process according to the invention.

This variant makes it possible especially to obtain polymers having a low polydispersity index ($M_w/M_n$), in general not more than 2, preferably not more than 1.5, Mw being the molecular mass by weight.

More particularly, the acid used is a compound of formula $R_3COOH$, in which formula $R_3$ represents an optionally substituted alkyl, aryl, aralkyl, alkene or alkyne group, an optionally substituted aromatic, saturated or unsaturated heterocycle or carbon ring.

The process of the invention can be implemented starting from a mixture of ethylenically unsaturated monomers. In that case a random first generation polymer is obtained. By selecting monomers of particular types, for example, hydrophilic monomers and hydrophobic monomers, and the amount of each of these monomers in the block, a block is obtained which has particular properties. This procedure is particularly advantageous when the first generation polymer thus obtained is an intermediate in the preparation of a block copolymer.

The present invention likewise provides a process for preparing an Nth generation block copolymer by free radical polymerization, N being greater than or equal to 2, which comprises:

a first step of free radical polymerization as described above, in order to form the first generation polymer, followed by N-1 steps of free radical polymerization, each of these steps being implemented starting from a composition as described above comprising:
  at least one ethylenically unsaturated monomer,
  a source of free radicals, and
  the block polymer obtained in the preceding step of free radical polymerization, the ethylenically unsaturated monomer or monomers being such that the block formed in this step is different in nature to the block formed in the preceding step.

For example, a second generation block copolymer can be obtained by a process which comprises the free radical polymerization of a composition comprising:
  at least one ethylenically unsaturated monomer,
  a source of free radicals, and
  the first generation polymer obtained by free radical polymerization of the composition comprising the cyclic organic compound comprising at least one tetrathiophosphate group and ethylenically unsaturated monomers, the block thus obtained being different in nature to the first generation polymer.

In accordance with one embodiment of the invention, (1) a first generation polymer is synthesized starting from a composition comprising one or more ethylenically unsaturated monomers, a source of free radicals and a cyclic organic compound comprising at least one tetrathiophosphate group, and then (2) the first generation polymer obtained in step (1) is used to prepare a diblock (second generation) copolymer by contacting this first generation polymer with one or more ethylenically unsaturated monomers and a source of free radicals, the block obtained in step (2) being different in nature to the first generation polymer of step (1).

This step (2) may be repeated with further monomers and the diblock copolymer obtained in order to synthesize a new block and to obtain a triblock copolymer.

Thus it is possible to repeat as many times as necessary the step of polymerization starting from a block copolymer to give a copolymer having an additional block.

The process of the invention therefore makes it possible to obtain a diblock copolymer comprising two blocks of formula (V):

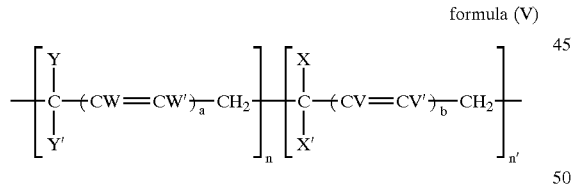

formula (V)

starting from a composition comprising:
  an ethylenically unsaturated monomer of formula (VIB):
    CYY'(CW=CW')$_a$=CH$_2$,
  a first generation polymer as described above,
  n and n', which are identical or different, are greater than or equal to 1,
  V, V', W and W', which are identical or different, represent: H, an alkyl group or a halogen,
  X, X', Y and Y', which are identical or different, represent H, a halogen or a group R$_2$, OR$_2$, O$_2$COR$_2$, NHCOH, OH, NH$_2$, NHR$_2$, N(R$_2$)$_2$, (R$_2$)$_2$N$^+$O$^-$, NHCOR$_2$, CO$_2$H, CO$_2$R$_2$, CN, CONH$_2$, CONHR$_2$ or CON(R$_2$)$_2$, in which R$_2$ is selected from alkyl, aryl, aralkyl, alkaryl, alkene or organosilyl groups which are optionally perfluorinated and optionally substituted by one or more carboxy, epoxy, hydroxyl, alkoxy, amino, halogen or sulfonic groups, and
  a and b, which are identical or different, are 0 or 1.

The ethylenically unsaturated monomers which are useful are those described above.

In accordance with this process for preparing block polymers, when it is desired to obtain polymers having blocks which are homogeneous and do not have a composition gradient, and if all the successive polymerizations are conducted in the same reactor, it is essential that all of the monomers used in one step have been consumed before the polymerization of the following step begins, i.e. before the next monomers are introduced.

When the desire is to obtain a random block, the polymerization step is implemented with a composition containing a mixture of ethylenically unsaturated monomers.

The present invention further provides first generation polymers and block polymers obtainable by any one of the processes of the invention. These polymers have a controlled molecular mass.

In accordance with one specific embodiment, the block polymers comprise at least two polymeric blocks selected from the following combinations:
  polystyrene/poly-p-methylstyrene,
  polystyrene/polymethyl acrylate,
  polystyrene/polyethyl acrylate,
  polystyrene/poly-tert-butyl acrylate,
  polystyrene/polyvinylpyridine,
  polystyrene/polybutadiene One of the blocks may also be composed of a random copolymer obtained starting from a mixture of ethylenically unsaturated monomers.

The following examples illustrate the invention without, however, limiting its scope.

EXAMPLES

Example 1

Synthesis of Compounds of Formula (IB)

Example 1.1

Synthesis of 2,4-bis(phenylthio)-2,4-dithioxo-1,3,2, 4-dithiadiphosphetane (IB2)

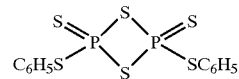

(IB2)

The method is derived from the reference H. Davy, *Sulfur Letters*, vol. 3(2) 39, (1985). P$_4$S$_{10}$ (44.4 g, 0.1 mol) is mixed with 150 ml of dichlorobenzene until this solvent refluxes (160° C.). Phenylthiol (47 ml) is slowly added to the solution over 90 minutes, while increasing the temperature up to 190° C. The solution becomes clear; the reaction temperature is reduced to 100° C. The stirring is stopped in order to allow the residual P$_4$S$_{10}$ to be separated by settling. The solution is filtered in the hot state. The product crystallizes after filtration. The yield is 60%.

$^1$H NMR (CS$_2$): 7.3–7.7 ppm: phenyl group. $^{31}$P NMR (CS$_2$): 22.9 ppm.

Example 1.2

Synthesis of 2,4-bis(benzylthio)-2,4-dithioxo-1,3,2,4-dithiadiphosphetane (IB1)

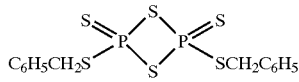
(IB1)

The method is derived from the reference H. Davy, *Sulfur Letters*, vol. 3(2) 39, (1985). $P_4S_{10}$ (8.88 g, 0.02 mol) is mixed with 30 ml of dichlorobenzene until this solvent refluxes (160° C.). Benzylthiol (16.5 ml; 0.14 mol) is slowly added to the solution over 40 minutes, while increasing the temperature up to 190° C. The solution becomes clear; the reaction temperature is then reduced to 80° C. The stirring is stopped in order to allow the residual $P_4S_{10}$ to be separated by settling. The solution is filtered in the hot state. The product crystallizes slowly after filtration. The yield is 50%.

Example 2

Synthesis of the Polymers

In the examples given below, the polymerization reactions are carried out in Schlenk-type apparatus. In each case, the mixture present in the reactor is connected to a vacuum ramp, immersed in liquid nitrogen, followed by three cycles of freezing-vacuum-return to ambient temperature in order to degas the mixture. The reactor is subsequently left under nitrogen at the appropriate temperature. Kinetic monitoring is carried out by taking samples of the reaction medium over time, under a stream of nitrogen. The monomer conversion is determined by gravimetry following evaporation of the residual monomer under vacuum.

The (co)polymers are analyzed by steric exclusion chromatography (SEC) using THF as elution solvent; the molar masses are expressed in polystyrene equivalents (g.mol$^{-1}$).

These examples demonstrate that the free radical polymerization of the ethylenically unsaturated monomers is controlled, employing the tetrathiophosphate-bearing cyclic precursors. Polymerization control is demonstrated in particular through the increase in the number average molar masses (Mn) with the monomer conversion.

Example 2.1

Polystyrene Prepared from $P_4S_{10}$ 0.015 g (3.33×10$^{-5}$ mol) of $P_4S_{10}$, 5.5 mg (3.33×10$^{-5}$ mol) of AIBN and 4.54 g (4.37×10$^{-2}$ mol) of styrene are mixed. After degassing, the reaction medium is heated to 60° C. The change in number average molar mass with the conversion of the styrene is indicated in table 1 below.

TABLE 1

Mass polymerization of styrene initiated by AIBN in the presence of $P_4S_{10}$: $[S]/[P_4S_{10}] = 1313$, $[AIBN]/[P_4S_{10}] = 1$, T = 60° C.

| Sample | Time (h) | Conversion (%) | $M_n \times 10^{-3}$ (g/mol) |
|---|---|---|---|
| 1 | 1 | 1 | 8 |
| 2 | 3 | 3 | 14 |

TABLE 1-continued

Mass polymerization of styrene initiated by AIBN in the presence of $P_4S_{10}$: $[S]/[P_4S_{10}] = 1313$, $[AIBN]/[P_4S_{10}] = 1$, T = 60° C.

| Sample | Time (h) | Conversion (%) | $M_n \times 10^{-3}$ (g/mol) |
|---|---|---|---|
| 3 | 7 | 6 | 22 |
| 4 | 21 | 15 | 43 |
| 5 | 29 | 20 | 44 |
| 6 | 48 | 28 | 50 |

Example 2.2

Polystyrene Prepared from 2,4-dithioxo-2,4-bis(methylthio)-1,3,2,4-dithiadiphosphetane (IB3)

0.125 g (4.39×10$^{-4}$ mol) of precursor 2,4-dithioxo-2,4-bis(methylthio)-1,3,2,4-dithiadiphosphetane, 7.5 mg (4.57×10$^{-5}$ mol) of AIBN and 4.54 g (4.37×10$^{-2}$ mol) of styrene are mixed. After degassing, the solution is heated to 60° C. The change in number average molar mass with the conversion of the styrene is indicated in table 2 below.

TABLE 2

Mass polymerization of the styrene initiated by AIBN in the presence of 2,4-dithioxo-2,4-bis-(methylthio)-1,3,2,4-dithiadiphosphetane: $[S]/[IB3] = 100$, $[AIBN]/[IB3] = 0.1$, T = 60° C.

| Sample | Time | Conversion (%) | $M_n \times 10^{-3}$ (g/mol) |
|---|---|---|---|
| 1 | 2 h 15 min | 10 | 3.9 |
| 2 | 4 h 40 min | 17 | 9 |
| 3 | 22 h 50 min | 40 | 25 |
| 4 | 44 h | 60 | 70 |

Example 2.3

Polystyrene Prepared in the Presence of 2,4-dithioxo-2,4-bis(benzylthio)-1,3,2,4-dithiadiphosphetane (IB1) and Benzoic Acid 0.114 g (2.62×10$^{-4}$ mol) of precursor 2,4-dithioxo-2,4-bis(benzylthio)-1,3,2,4-dithiadiphosphetane (IB1), 67 mg (5.5×10$^{-4}$ mol) of benzoic acid are mixed in 3 ml of toluene at 110° C. for one hour.

After returning to ambient temperature, 17.2 mg (1.04×10$^{-4}$ mol) of AIBN and 6 ml (5.24×10$^{-2}$ mol) of styrene are added. After degassing, the solution is heated to 60° C. The change in number average molar mass with the conversion of the styrene is indicated in table 3 below:

TABLE 3

Mass polymerization of the styrene initiated by AIBN in the presence of 2,4-dithioxo-2,4-bis(benzylthio)-1,3,2,4-dithiadiphosphetane and benzoic acid: $[S]/2[IB1] = 100$; $[C_6H_5COOH]/[IB1] = 2.1$; $[AIBN]/2[IB1] = 0.2$; T = 60° C.

| Sample | Time | Conversion (%) | $M_n \times 10^{-3}$ (g/mol) |
|---|---|---|---|
| 1 | 1 h 15 min | 5 | 0.4 |
| 2 | 4 h | 15 | 0.5 |
| 3 | 7 h 30 min | 22 | 1.2 |
| 4 | 23 h | 45 | 4 |

Example 2.3

Homopolystyrene Prepared in the Presence of 2,4-dithioxo-2,4-bis(phenylthio)-1,3,2,4-dithiadiphosphetane (IB2) and Benzoic Acid 37 mg ($9.21 \times 10^{-5}$ mol) of precursor 2,4-dithioxo-2,4-bis(phenylthio)-1,3,2,4-dithiadiphosphetane (IB2), 20 mg ($5.5 \times 10^{-4}$ mol) of benzoic acid and 3 ml ($2.62 \times 10^{-2}$ mol) of styrene are mixed. After degassing, the solution is heated to 110° C. The change in number average molar mass with the conversion of the styrene is indicated in table 4 below:

TABLE 4

Mass polymerization of the styrene initiated by AIBN in the presence of 2,4-dithioxo-2,4-bis(phenylthio)-1,3,2,4-dithiadiphosphetane and benzoic acid: [S]/2[IB2] = 142; [C$_6$H$_5$COOH]/[IB2] = 1.85; T = 110° C.

| Sample | Time (h) | Conversion (%) | $M_n \times 10^{-3}$ (g/mol) |
|---|---|---|---|
| 1 | 15 | 15 | 1.2 |
| 2 | 44 | 24 | 5.6 |
| 3 | 111 | 70 | 11 |

What is claimed is:

1. A process for preparing a first generation polymer, which comprises a step of free radical polymerization of a composition comprising:
    at least one ethylenically unsaturated monomer,
    a source of free radicals, and
    at least one cyclic organic compound comprising at least one tetrathiophosphate.

2. The process of claim 1, wherein the cyclic organic compound comprising at least one tetrathiophosphate group is selected from the group consisting of a compound of formula (IA) (tetraphosphorus decasulfide or P$_4$S$_{10}$) and a compound of general formula (IB):

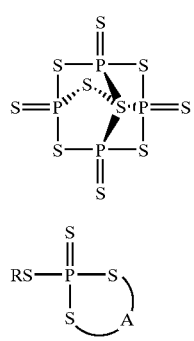

(IA)

(IB)

where A represents a substituted or non-substituted, linear or branched alkyl radical, or a group selected from the groups consisting of the following formulae (IIA) and (IIB):

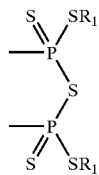

(IIA)

(IIB)

with R$_1$, which are identical or different, represents a substituted or non-substituted alkyl, aryl, aralkyl, alkene or alkyne group, and where R, which is different or identical, represents:
    a substituted or non-substituted alkyl, aryl, aralkyl, alkene or alkyne group,
    a substituted or non-substituted, aromatic, saturated or unsaturated heterocycle or carbon ring,
    a polymeric chain,
    a radical of formula (IIIA):

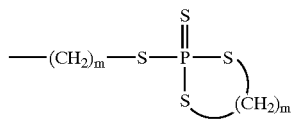

a radical of formula (IIIB):

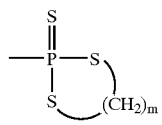

with m an integer greater than or equal to 2.

3. The process of claim 2, wherein the compound of formula (IB) is selected from the group consisting of compounds of formula (IB) with A representing a group of formula (IIA) or (IIB), in which the groups R and R$_1$ are identical.

4. The method as claimed in claim 2, wherein the cyclic organic compound comprising at least one tetrathiophosphate group is a compound of formula (IB) in which A represents a radical of formula:

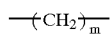

in which m is an integer greater than or equal to 2.

5. The process of claim 2, wherein the compounds of formula (IB) are selected from the group consisting of compounds of the following formulae (IB1) to (IB5):

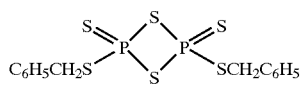

(IB1)

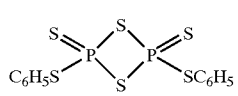

(IB2)

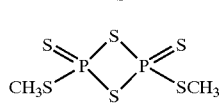

(IB3)

-continued

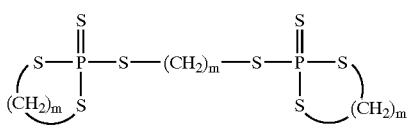
(IB4)

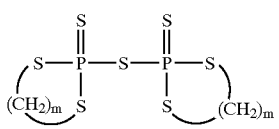
(IB5)

in which m is an integer greater than or equal to 2.

6. The process as claimed in claim 1, wherein the composition further comprises at least one acidic organic compound.

7. The process as claimed in claim 1, in which the ethylenically unsaturated monomer corresponds to the following formula (VIA):

and the first generation polymer obtained comprises n times the unit of formula (IV):

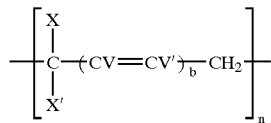

with
n is greater than or equal to 1,
V, V', which are identical or different, represent a hydrogen atom, an alkyl group or a halogen,
X and X', which are identical or different, represent H, a halogen or a group $R_2$, $OR_2$, $O_2COR_2$, $NHCOH$,$^-OH$, $NH_2$, $NHR_2$, $N(R_2)_2$, $(R_2)_2N^+O^-$, $NHCOR_2$, $CO_2H$, $CO_2R_2$, $CN$, $CONH_2$, $CONHR_2$ or $CON(R_2)_2$, in which $R_2$ is selected from alkyl, aryl, aralkyl, alkaryl, alkene or organosilyl groups which are optionally perfluorinated and optionally substituted by one or more carboxy, epoxy, hydroxyl, alkoxy, amino, halogen or sulfonic groups, and
b is 0 or 1.

8. A process for preparing an Nth generation block copolymer by free radical polymerization, N being greater than or equal to 2, which comprises:
a first step of free radical polymerization in order to form a first generation polymer from a composition comprising:
at least one ethylenically unsaturated monomer,
a source of free radicals, and
at least one cyclic organic compound comprising at least one tetrathiophosphate group,
a number N-1 steps of free radical polymerization, each of these steps being implemented starting from a composition comprising:
at least one ethylenically unsaturated monomer,
a source of free radicals, and
the block polymer obtained in the preceding step of polymerization, the ethylenically unsaturated monomer or monomers being such that the block formed in this step is different in nature to the block formed in the preceding step.

9. The process as claimed in claim 8, for preparing a second generation block copolymer which comprises the free radical polymerization of a composition comprising:
at least one ethylenically unsaturated monomer,
a source of free radicals, and
the first generation polymer.

10. The process as claimed in claim 8, for preparing a block copolymer comprising two blocks of formula (V):

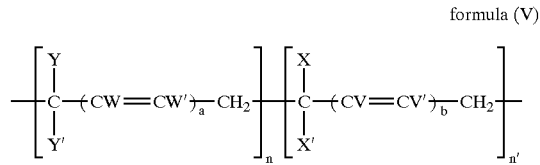
formula (V)

starting from a composition comprising:
an ethylenically unsaturated monomer of formula (VIB):
$CYY'$ $(CW=CW')_a=CH_2$,
said first generation polymer,
n and n', which are identical or different, are greater than or equal to 1,
V, V', W and W', which are identical or different, represent: H, an alkyl group or a halogen,
X, X', Y and Y', which are identical or different, represent H, a halogen or a group $R_2$, $OR_2$, $O_2COR_2$, $NHCOH$, $OH$, $NH_2$, $NHR_2$, $N(R_2)_2$, $(R_2)_2N^+O^-$, $NHCOR_2$, $CO_2H$, $CO_2R_2$, $CN$, $CONH_2$, $CONHR_2$ or $CON(R_2)_2$, in which $R_2$ is selected from alkyl, aryl, aralkyl, alkaryl, alkene or organosilyl groups which are optionally perfluorinated and optionally substituted by one or more carboxy, epoxy, hydroxyl, alkoxy, amino, halogen or sulfonic groups, and
a and b, which are identical or different, are 0 or 1.

11. The process as claimed in claim 1, in which the at least one ethylenically unsaturated monomer is selected from the group consisting of styrene, alpha-methylstyrene, vinyltoluene, vinyl halides, vinyl nitriles, dienes, unsaturated ethylenic monomers containing a secondary, tertiary or quaternary amino group and a heterocyclic group containing nitrogen.

12. A polymer obtainable by the process as defined in claim 1.

13. The polymer as claimed in claim 12, which has a polydispersity index of not more than 2.

14. The polymer obtainable by the process of claim 10 which has at least two polymeric blocks.

15. The polymer as claimed claim 14, in which the at least two polymeric blocks are selected from the following combinations:
polystyrene/poly-p-methylstyrene,
polystyrene/polymethyl acrylate,
polystyrene/polyethyl acrylate,
polystyrene/poly-tert-butyl acrylate,
polystyrene/polyvinylpyridine, or
polystyrene/polybutadiene.

16. The polymer as claimed in claim 14, in which at least one of the blocks consists of a random polymer obtained from a mixture of ethylenically unsaturated monomers.

17. The process as claimed in claim 7, where n is greater than 6.

18. The process as claimed in claim 3, wherein the cyclic organic compound comprising at least one tetrathiophosphate group is a compound of formula (1B) in which A represents a radical of the formula:

in which m is an integer greater than or equal to 2.

19. The process as claimed in claim 2, wherein the composition further comprises at least one acidic organic compound.

20. The process as claimed in claim 3, wherein the composition further comprises at least one acidic organic compound.

21. The process as claimed in claim 5, wherein the composition further comprises at least one acidic organic compound.

22. A polymer obtainable by the process as defined in claim 11, which comprises at least two polymeric blocks.

23. The process as claimed in claim 8, in which the at least one ethylenically unsaturated monomer is selected from the group consisting of styrene, alpha-methylstyrene, vinyltoluene, vinyl halides, vinyl nitriles, conjugated dienes, unsaturated ethylenic monomers containing a secondary, tertiary or quaternary amino group and a heterocyclic group containing nitrogen.

24. The process as claimed in claim 11, wherein the at least one ethylenically unsaturated monomer is selected from the group consisting of butadiene, chloroprene, styrene, α-methylstyrene, vinyltoluene, vinyl and vinylidene halides, vinyl nitriles, vinyl pyridine and vinylimidazole.

* * * * *